US006991176B1

(12) United States Patent
Schwenk et al.

(10) Patent No.: US 6,991,176 B1
(45) Date of Patent: Jan. 31, 2006

(54) METHOD FOR GENERATING IDENTIFICATION NUMBERS

(75) Inventors: Joerg Schwenk, Dieburg (DE); Tobias Martin, Rabenau-Ruddinghausen (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/937,923

(22) PCT Filed: Mar. 21, 2000

(86) PCT No.: PCT/EP00/02481

§ 371 (c)(1), (2), (4) Date: Dec. 20, 2001

(87) PCT Pub. No.: WO00/60551

PCT Pub. Date: Oct. 12, 2000

(30) Foreign Application Priority Data

Mar. 30, 1999 (DE) .......................................... 199 14 407

(51) Int. Cl.
*G06K 19/06* (2006.01)

(52) U.S. Cl. ...................................................... 235/494

(58) Field of Classification Search ................. 235/494, 235/380, 382, 487, 449; 713/179, 184, 183; 708/250, 255; 340/5.81, 5.85; 705/72

See application file for complete search history.

(56) References Cited

U.S. PATENT DOCUMENTS

| | | | | | |
|---|---|---|---|---|---|
| 3,846,622 | A | | 11/1974 | Meyer | |
| 3,906,447 | A | | 9/1975 | Crafton | |
| 4,376,279 | A | * | 3/1983 | Perlman et al. | 235/380 |
| 4,605,820 | A | | 8/1986 | Campbell, Jr. | |
| 4,614,861 | A | * | 9/1986 | Pavlov et al. | 235/380 |
| 4,635,054 | A | * | 1/1987 | Goldman | 340/5.85 |
| 5,233,656 | A | * | 8/1993 | Langrand et al. | 380/248 |
| 5,363,449 | A | | 11/1994 | Bestock | |
| 5,778,071 | A | | 7/1998 | Caputo et al. | |
| 5,781,458 | A | * | 7/1998 | Gilley | 708/255 |
| 5,825,885 | A | * | 10/1998 | Miyaji et al. | 705/76 |
| 5,971,272 | A | * | 10/1999 | Hsiao | 235/380 |
| 6,061,702 | A | * | 5/2000 | Hoffman | 708/251 |
| 6,104,811 | A | * | 8/2000 | Aiello et al. | 380/46 |
| 6,324,558 | B1 | * | 11/2001 | Wilber | 708/255 |
| 6,643,374 | B1 | * | 11/2003 | Wells et al. | 380/47 |
| 6,691,301 | B2 | * | 2/2004 | Bowen | 717/114 |

FOREIGN PATENT DOCUMENTS

| | | | |
|---|---|---|---|
| DE | 21 08 223 | | 2/1971 |
| EP | 0 798 891 | | 10/1997 |
| FR | 2 577 704 | | 8/1986 |
| WO | 01/38950 | * | 5/2001 |

OTHER PUBLICATIONS

Schwind, Manfred; "Erzeugung unkorreliester dezimater Zufallsfolgen aus Binaerfolgen nach einem Selektions–ud Puffer verfahren," Frequenz 34, 1980, 9, pp. 260–264.

* cited by examiner

*Primary Examiner*—Thien M. Le
*Assistant Examiner*—Edwyn Labaze
(74) *Attorney, Agent, or Firm*—Kenyon & Kenyon

(57) ABSTRACT

A method for generating a personal identification number (PIN), made up of a number of N decimal digits, to be used for money cards and other devices requiring security, from a binary number having L digits, in particular from a binary code specific to an individual, the PINs are generated such that they are randomly uniformly distributed over the available number domain.

21 Claims, 2 Drawing Sheets

METHOD FOR GENERATING IDENTIFICATION NUMBERS

FIELD OF THE INVENTION

The present invention relates to a method for generating a personal identification number (PIN), made up of a number of N decimal digits, to be used for money cards and other devices requiring security, from a binary number having L digits, in particular from a binary code specific to an individual.

BACKGROUND INFORMATION

When using automatic cash dispensers, such as ATM machines or similar devices where a plastic card is utilized, the user must often use a four-digit number (PIN) known only to himself in order to receive authorization. There are, by far, however, not as many different PINs as there are users, which is why each PIN exists many times over.

The PINs may only contain decimal digits, to enable them to be entered using numerical keypads. In addition, they are not supposed to begin with a zero. This means that, given four digit positions, the result is a range of 9000 different PINS. The theoretically lowest probability of correctly guessing a PIN is, thus, 1/9000.

SUMMARY OF THE INVENTION

An exemplary method and/or exemplary embodiment of the present invention is directed to providing a method which will keep the probability of a PIN being correctly guessed as low as possible.

When the PINs are generated such that they are randomly uniformly distributed over the available number domain, the probability of a PIN being correctly ascertained may then become minimal.

With the aid of an encryption algorithm, a secret key may be used to produce a binary code from personal data pertaining to the user. Using the DES (data encryption standard) or triple DES algorithm provided, for example, for generating PINs for money cards, a 64-digit binary code is generated from the data pertaining to one customer, with the assistance of a bank-specific key. From a 16-digit segment of this binary code, the PIN can be generated in the following manner.

For example, four parts for each of the four digits of this binary number are combined into four decimal numbers. These four decimal numbers are divided by 10 (modulo function) to yield the four digits of the PIN as a remainder of a division. If the first digit is a zero, it is replaced by a one. To a large degree, however, the resultant PINs are unevenly distributed over the available number domain of 1 to 9000. If it begins with a 1, a PIN generated in this manner has a probability of being correctly guessed of even greater than 1/150.

If, on the other hand, the PINs are distributed uniformly over the number domain, then the rate of occurrence of each PIN is constantly 1/9000, and the probability of it being correctly guessed is, therefore, also minimal.

Another exemplary embodiment and/or exemplary method of the present invention provides for the first n1 digits of the binary number (B) to be converted in an available manner into a decimal number d1, the predefinable natural number n1 being selected so as to yield a natural number z1 such that the quotient $2^{n1}/(z1*9)$ is close to 1; and for the first decimal digit of the PIN to receive the value d1 modulo 9; for N-1 further groups of further n2 digits of the binary number (B) to be converted each time in an available manner into N-1 decimal numbers d2 through dN, the predefinable number n2 being selected so as to yield a natural number z2 such that the quotient $2^{n2}/(z2*10)$ is close to 1, to satisfy the condition: $0<=2^{n2}$ modulo 10<3; and for the decimal digits 2 through N of the PIN to receive the values di modulo 10, i=2 through N.

To generate the first digit of the PIN, n1 is selected so that $2^{n1}$ is close to a multiple of 9. The n-1 digit part to the front of the binary number is interpreted as a decimal number. The integer remainder is calculated by dividing by 9. This remainder forms the first digit of the PIN. To generate digit 2 and the following digits of the PIN, n2 bits are split off each time. The number n2 is selected such that $2^n$ is close to a multiple of 10. The resulting number is interpreted as a decimal number. The integer remainder is calculated by dividing by 10. This remainder forms the respective digit of the PIN. It is true that no absolute uniform distribution is derived hereby. However, the greater n2 is, the more uniformly the PIN numbers are distributed.

For example, selecting n2=13 results in a number domain of from 1 to $2^{13}$=8192. The digits 0, 1, 2 and 3 occur in the generated PINs with a probability of 820/8192, and the remaining digits with a probability of 819/8192. The exemplary embodiments and/or exemplary methods of the present invention may avoid having the 1 occur all too often in the first digit position of the PIN.

A further exemplary embodiment and/or exemplary method of the present invention is directed to providing for n1 and n2<=16 to be predefined.

A further exemplary embodiment and/or exemplary method of the present invention is directed to providing for N=4 to be selected.

A further exemplary embodiment and/or exemplary method of the present invention is directed to providing for the binary number (B) to have the length L=16, for N=4 to be predefined, and for nl=n2=4 to be predefined.

A further exemplary embodiment and/or exemplary method of the present invention is directed to providing for the binary number (B) to have the length L=3*n3, for n3 groups of three digits of the binary number (B) to be converted in an available manner into n3 decimal digits to generate the digits of the PIN, n3 being a natural number. In this variant, altogether 12 bits of the customer-specific binary code are used to generate the PIN. In each case, three bits of this binary number are interpreted as decimal digits between 1 and 8. The PINs produced in this manner are absolutely uniformly distributed.

Another exemplary embodiment and/or exemplary method for generating absolutely uniformly distributed PINs within the particular number domain provides for the binary number to be completely converted into a decimal number, in order to generate the PIN in an available manner, and, if necessary, to add a correction value to the resultant decimal number such that the first digit of the decimal number becomes unequal to zero, the digits of the result forming the digits of the PIN.

To this end, it may be provided for the binary number to have a length L of 13, for the generated decimal number to have four digits, and for a preset value greater than 999 and smaller than 1807 to be added to the decimal number; for the binary number to have a length L of 16, for the generated decimal number to have five digit positions, and for a preset value greater than 9999 and smaller than 34465 to be added to the decimal number.

Furthermore, it may be provided in the first case (L=13) for the set of numbers 0 through 8191 to be allocated to n5 subsets Ml, . . ., Mn5, and for a preset value di to be added to the generated decimal number if it is an element of the set Mi, it holding that 999<dl<d2< . . . <dn5<1809, and n5 being a natural number.

Furthermore, it may be provided in the second case (L=16) for the set of numbers 0 through 65535 to be allocated to n5 subsets Ml, . . . , Mn5, and for a preset value di to be added to the generated decimal number if it is an element of the set Mi, it holding that 9999<dl<d2< . . . <dn5<34465, and n5 being a natural number.

Another exemplary embodiment and/or exemplary method of the present invention provides for executing the following steps to generate the first digits of the PIN:

- a pseudo-random number composed of up to 36 hexadecimal digits is generated from the binary number (B) of length L;
- each hexadecimal digit of this number is converted using one different one out of the 36 possible mathematical mappings of hexadecimal digits into the digits 1 through 9, into a digit of the digits 1 through 9;
- to even out the probability of the particular PIN digit occurring, the up to 36 decimal digits of the thus generated number are linked or associated in a mathematical operation to form a decimal digit unequal to zero, which represents the first digit of the PIN;

and for the following steps to be executed for the second and each following digit of the PIN to be generated:

- a pseudo-random number composed of up to 210 hexadecimal digits is generated from the binary number (B) of length L;
- each hexadecimal digit of this number is converted into one decimal digit using each time one different one out of the 210 possible mathematical mappings of hexadecimal digits into decimal digits;
- to average out the probability of the particular PIN digit occurring, the up to 210 decimal digits of the thus generated number are linked in a mathematical operation to form a decimal digit, which represents the particular digit of the PIN;

In another exemplary embodiment and/or exemplary method, the first digit of the PIN may be generated so that the up to 36 digits are linked using the group operation of any arbitrary mathematical group of the order 9, and that the second and the following digits of the PIN are generated, so that the up to 210 digits are linked using the group operation of any arbitrary mathematical group of the order 10.

In this exemplary embodiment and/or exemplary method of the present invention, one hexidecimal number each is generated from N groups of 4 bit length each. It is intended at this point to convert it into a decimal digit. Altogether (10 over 6)=(10 over 4)=210 different mappings of the hexadecimal digits into the set of decimal digits are available for this conversion. One possible mapping is forming the remainder in a division operation by 10: (0->0, 1->1, 2->2, 3->3, 4->4, 5->5, 6->6, 7->7, 8->8, 9->9, A->0, B->1, C->2, D->3, E->4, F->5). Following this mapping operation, the digits 0 to 5 occur with the rate of occurrence of 1/8, and the digits from 6 to 9 with the rate of occurrence of 1/16. At this point, in order to obtain digits whose probability of occurrence does not deviate or deviates imperceptibly from 1/10, it is proposed to convert the 210 hexadecimal digits, which were generated, for example, by applying the above-mentioned DES algorithm 14 times to the 64-digit binary initial number, (therefore, pseudo-random number, since the generated number is in no way randomly formed), using one each of the other 210 possible mappings, into a decimal digit and, subsequently, linking all 210 decimal digits to one single digit using a group operation of a mathematical group having ten elements. The probability of occurrence of each of the thus generated decimal digits is close to 1/10.

Another exemplary embodiment and/or exemplary method of the present invention is directed to providing for the additive group of the integers modulo 10 to be used to link the up to 210 digits. In this context, 210 decimal digits are linked to form one single digit, in that one adds all digits and takes as a result, the remainder of a division of the sum by 10. The ten possible results that occur in the process constitute the elements of the additive group $Z_{10,+}$.

Another exemplary embodiment and/or exemplary method of the present invention provides for using the multiplicative group of the integers modulo 11 for linking the up to 210 digits. This group $Z^*_{11}$ likewise has ten elements and is, therefore, suited for linking the numbers to a decimal digit. In $Z^*_{11}$, one calculates by multiplying two elements and dividing the result by 11. The remaining remainder forms the result of the operation. The zero is removed from the group. The 0 occurring in the digits indexes element no. 10 of the group $Z^*_{11}$.

Another exemplary embodiment and/or exemplary method of the present invention is directed to providing that the group of the symmetric mappings of a regular pentagon (dihedral group) be used for linking the up to 210 digits, each of the ten symmetric mappings of this group being assigned a different decimal digit. To this end, it may also be provided for the digit 0 to be assigned to the identity mapping, digits 1 through 4 to be assigned the four rotations about the midpoint of the pentagon, digits 5 through 9 to be assigned to the five reflections about the five axes of symmetry of the pentagon. If one executes two symmetric mappings one after another, then a symmetric mapping again results. Based on these allocations, one can set up the following multiplication table:

| * | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 0 | 6 | 7 | 8 | 9 | 5 |
| 2 | 2 | 3 | 4 | 0 | 1 | 7 | 8 | 9 | 5 | 6 |
| 3 | 3 | 4 | 0 | 1 | 2 | 8 | 9 | 5 | 6 | 7 |
| 4 | 4 | 0 | 1 | 2 | 3 | 9 | 5 | 6 | 7 | 8 |
| 5 | 5 | 9 | 8 | 7 | 6 | 0 | 4 | 3 | 2 | 1 |
| 6 | 6 | 5 | 9 | 8 | 7 | 1 | 0 | 4 | 3 | 2 |
| 7 | 7 | 6 | 5 | 9 | 8 | 2 | 1 | 0 | 4 | 3 |
| 8 | 8 | 7 | 6 | 5 | 9 | 3 | 2 | 1 | 0 | 4 |
| 9 | 9 | 8 | 7 | 6 | 5 | 4 | 3 | 2 | 1 | 0. |

With the assistance of this table, the 210 digits are linked to one single digit in that, utilizing the result from the previous operation as a row indicator and utilizing the next digit as a column indicator, the next result in the table is read off successively until all digits are considered. The last result forms the desired digit of the PIN.

DETAILED DESCRIPTION

Figure 1:
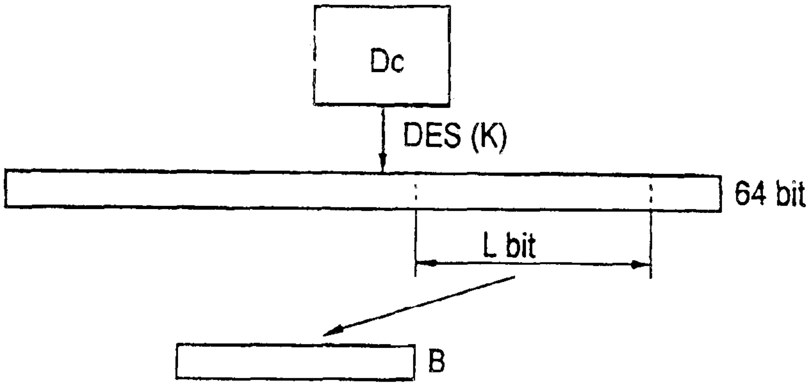
FIG. 1 shows a diagram for generating a customer-specific binary code.

FIG. 1 depicts a flow diagram for converting personal data Dc of a customer using a secret key K into a binary number B of L bits length. The binary number B is part of the 64-bit long encryption result, which was generated from the customer data Dc using the DES algorithm.

Figure 2:
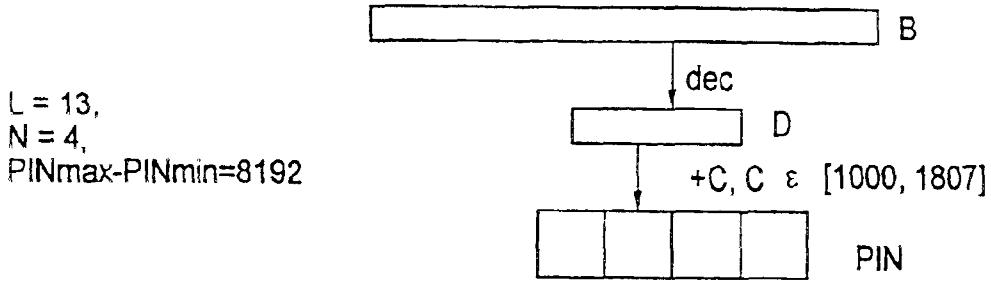
FIG. 2 shows a diagram for generating a PIN through conversion to a decimal number.

If the length of the binary number B equals 13, and if the number of the PIN digits to be generated equals 4, then the PIN, as shown in FIG. 2, can be generated by interpreting the binary number B as decimal number D by adding a constant C thereto. The constant is to be selected such that the PIN does not have any leading zeros. In this manner, 8192 different PINS can be generated, which are absolutely uniformly distributed over the number domain in question.

Figure 3:
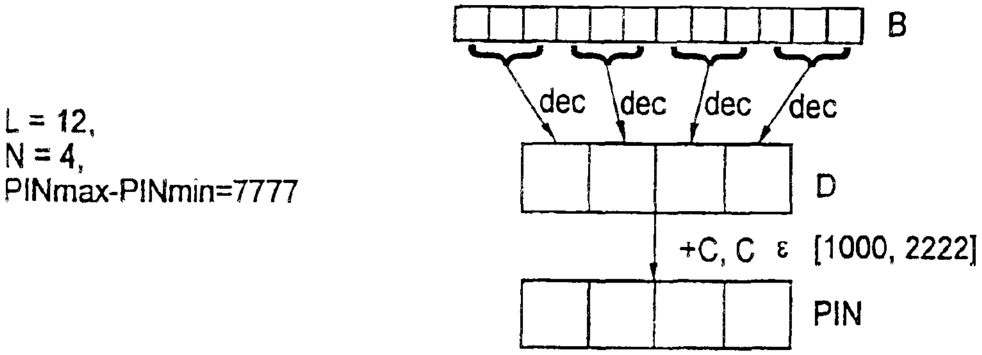
FIG. 3 shows a diagram for generating a PIN by a digit-by-digit conversion into decimal numbers.

FIG. 3 depicts how a binary number of length 13 can be converted into a PIN in that for each digit of the PIN to be generated, a number of bits of the binary number is converted into a decimal number, and a constant C is added to the resultant number D, to avoid having leading zeros of the PIN. In this manner, 7777 different PINS may be generated, which are absolutely uniformly distributed over the number domain in question.

Figure 4:
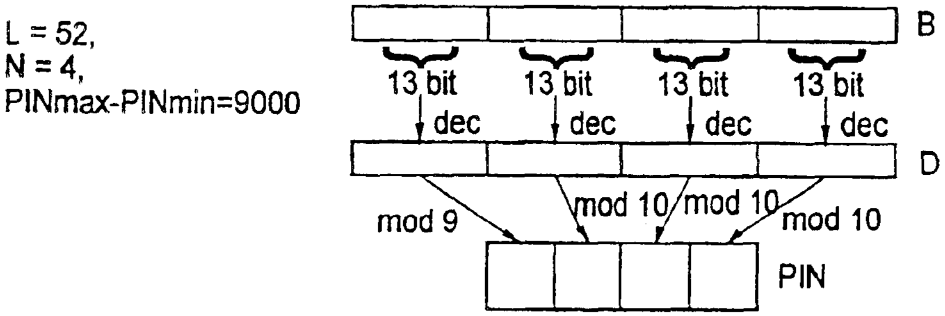
FIG. 4 shows a diagram for generating a PIN by a digit-by-digit conversion, including modulus formation.

Another example for generating nearly equally distributed PINs from a binary number B is illustrated in FIG. 4. The binary number B has 52 digit positions. To generate the four-digit PIN, the binary number B is subdivided into four subsets, which, in the example, have the same length. Each of these subsets is interpreted as a decimal number. The first digit of the PIN is derived as a remainder of a division of the first decimal number by 9. The following digits of the PIN are derived in each case as a remainder of a division of the following decimal number by 10. In this manner, 9000 different may be generated, which are absolutely uniformly distributed.

Figure 5:
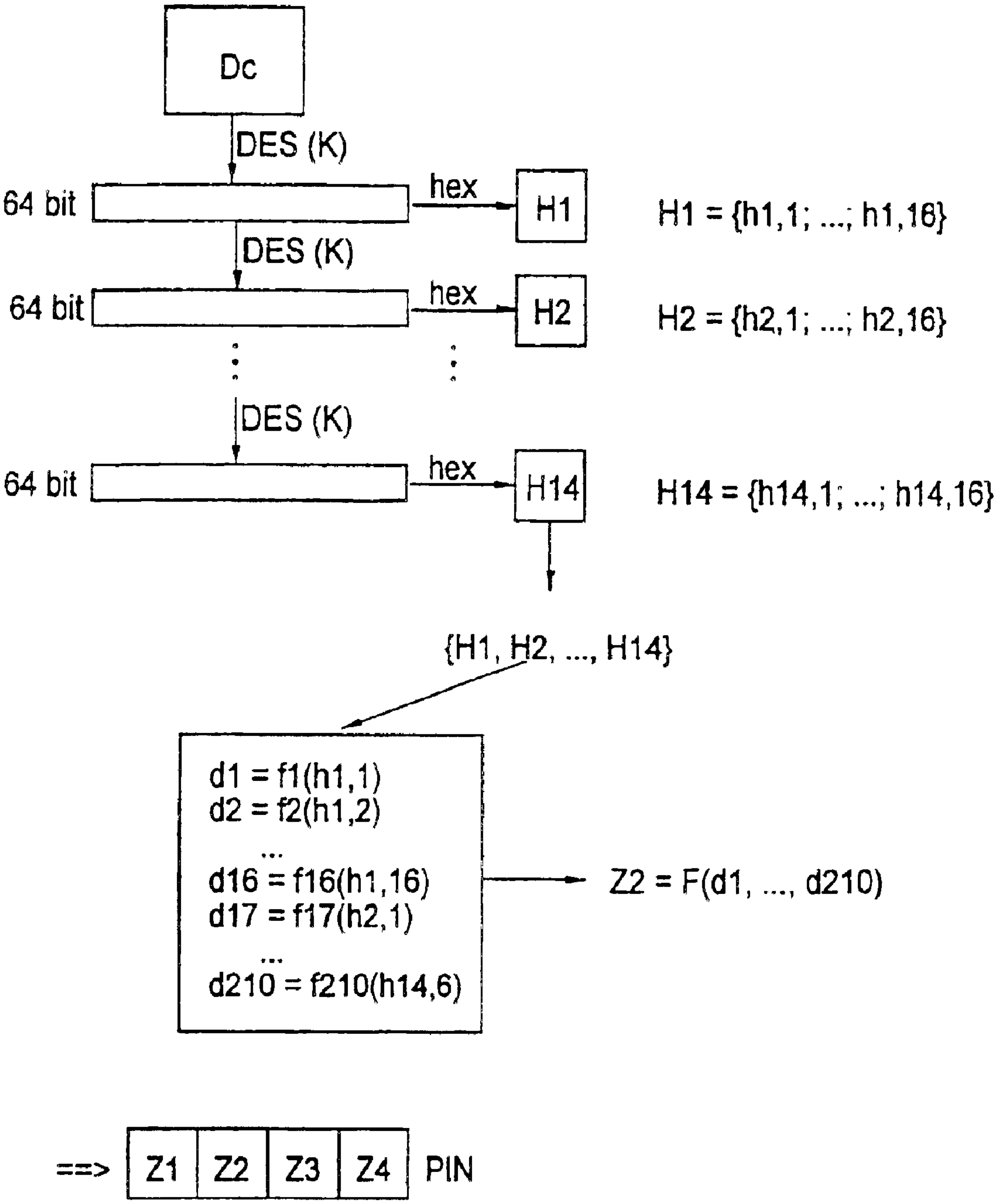
FIG. 5 shows a diagram for generating a PIN by reducing hexadecimal numbers with the assistance of mathematical groups.

From the personal data Dc of a customer, as shown in FIG. 5, a sequence of 210 hexadecimal digits is generated with the assistance of a secret key and a random-number generator, in that, for example, an encryption result of the DES algorithm from FIG. 1 is again encrypted using the algorithm, and so forth. The 14 64-digit binary codes resulting therefrom are converted into 14 hexadecimal numbers Hi, each having 16 digits. Lined up, this yields 224 hexadecimal digits, of which 210 enter into the generation of the PIN.

There are 210 different possibilities fi for mapping the set of 16 hexadecimal digits into the set of the 10 decimal digits. Therefore, each of the 210 hexadecimal digits is converted using a different one of these mappings into a decimal digit di. In order to produce a digit Zi of a PIN from the 210 decimal digits, they are successively linked using the group operation F of any arbitrary ten-element mathematical group; the last result is the sought after digit. Thus, the previously non-uniform, statistical distribution of the 210 decimal digits is evened out. The entire process is repeated for each of the digit positions Z2 through Z4 of the PIN.

Analogously for the first digit of the PIN, 36 hexadecimal digits are generated, which are mapped with every other one of the 36 possible mappings of the hexadecimal digits into the set of the digits 1 through 9, into a digit between 1 and 9. The 36 decimal digits are linked to the first digit of the PIN using the group operation of any arbitrary mathematical group of the order 9. This enables 9000 different PINs to be generated which are nearly uniformly distributed. In generating $10^5$ PINs, the maximum non-uniformities amounted to about 1.5 percent. This does not significantly raise the probability of a PIN being accidentally correctly guessed as compared to the theoretical minimum value. Thus, the method functions very reliably.

All mathematical groups having ten elements are fundamentally suited for use with this method. Known representatives include the additive group of the integers modulo 10, $Z_{10,+}$, the multiplicative group of the integers modulo 11, $Z^*_{11}$, as well as the group of the symmetric mapping(s) of a regular pentagon D5, the so-called dihedral group. In the last instance, one decimal digit, which may be used for the calculation, is assigned to each of the individual elements of the group.

What is claimed is:

1. A method for generating a personal identification number (PIN) having a number of N decimal digits, to be used for money cards and other security-requiring devices, comprising:

generating the personal identification number from a binary number having L digits so that the personal identification number is randomly distributed over an available number domain, converting a first predefinable natural number n1 of digits of the binary number into a first decimal number d1;

wherein:

the first predefinable natural number n1 of digits is selected so as to yield a first natural number z1 such that a quotient $2^{n1}/(z1*9)$ is close to 1;

a first decimal digit of the personal identification number receives a value first decimal number d1 modulo 9; and N−1 further groups of a second predefinable number n2 of digits of the binary number are converted each time into N−1 decimal numbers second decimal number d2 through Nth decimal number dN, the second predefinable number n2 being selected so as to yield a second natural number z2 such that a quotient $2^{n2}/(z2*10)$ is close to 1, to satisfy a condition of $0 \leqq 2^{n2}$ modulo $10<3$, and decimal digits 2 through N of the personal identification number receive values di modulo 10, i=2 through N.

2. The method of claim 1, wherein the first predefinable natural number n1 and the second predefinable number n2≦16 are predefined.

3. The method of claim 1, wherein the binary number has a length of L=16, and N=4 and n1=n2=4 are predefined.

4. The method of claim 1, wherein the binary number has a length L=3*n3, third natural number n3 groups of three digits of the binary number are converted into third natural number n3 decimal digits to generate third natural number n3 digits of the personal identification number.

5. The method of claim 1, wherein N=4 is selected.

6. The method of claim 1, wherein the binary number is fully converted into a decimal number to generate the personal identification number, and if necessary, a correction value is added to a resultant decimal number so that a first digit of the decimal number becomes unequal to zero, digits of the resultant decimal number forming the decimal digits of the personal identification number.

7. The method of claim 6, wherein the binary number has a length L of 13, the resultant decimal number has four digits, and a preset value greater than 999 and smaller than 1807 is added to the resultant decimal number.

8. The method of claim 7, wherein a set of numbers 0 through 8191 is allocated to natural number n5 subsets

M1, . . . , Mn5, and a preset value di is added to the resultant decimal number if it is an element of a set Mi, where 999<first decimal number d1<second decimal number d2< . . . <third decimal number dn5<1809.

9. The method of claim 6, wherein the binary number has a length L of 16, the resultant decimal number has five digits, and a preset value greater than 9999 and smaller than 34465 is added to the resultant decimal number.

10. The method of claim 9, wherein a set of numbers 0 through 65535 is allocated to natural number n5 subsets M1, . . . , Mn5, and a preset value di is added to the resultant decimal number if it is an element of a set Mi, where 9999<first decimal number d1<second decimal number d2< . . . <third decimal number dn5<34465.

11. A method for generating a personal identification number (PIN) having a number of N decimal digits, to be used for money cards and other security-requiring devices, comprising:

generating the personal identification number from a binary number having L digits so that the personal identification number is randomly distributed over an available number domain, wherein:

a first digit of the personal identification number is generated by:

generating a pseudo-random number composed of up to 36 hexadecimal digits from a binary number of a length L;

converting each hexadecimal digit of the pseudo-random number using one different one out of 36 possible different mathematical mappings of the 36 hexadecimal digits into digits 1 through 9, into another digit of the digits 1 through 9, forming a generated number;

linking up to 36 decimal digits of a generated number in a mathematical operating to form a decimal digit that is unequal to zero and that represents a first digit of the personal identification number, to average out a probability of a particular personal identification digit occurring; and a second digit and each following digit of the personal identification number is generated by:

generating another pseudo-random number composed of up to 210 hexadecimal digits from the binary number of length L;

converting each hexadecimal digit of the another pseudo-random number into one decimal digit using each time one different one out of a 210 possible mathematical mappings of hexadecimal digits into decimal digits; and linking up to 210 decimal digits of a generated number in a mathematical operation to form a decimal digit representing a particular digit of the personal identification number, to average out the probability of the particular personal identification digit occurring.

12. The method of claim 11, wherein the first digit of the personal identification number is generated in that the up to 36 digits are linked using a group operation of any arbitrary mathematical group of an order 9, and the second digit and each following digit of the personal identification number are generated in that the up to 210 digits are linked using a group operation of any arbitrary mathematical group of an order 10.

13. The method of claim 12, wherein an additive group of integers modulo 10 are used to link the up to 210 digits.

14. The method of claim 12, wherein a multiplicative group of integers modulo 11 are used to link the up to 210 digits.

15. The method of claim 12, wherein a group of symmetric mappings of at least one of a regular pentagon and a dihedral group is used to link the up to 210 digits, each ten symmetric mappings of the group of symmetric mappings of the at least one of the regular pentagon and the dihedral group being assigned a different decimal digit.

16. The method of claim 15, wherein a digit 0 is assigned to an identity mapping, digits 1 through 4 are assigned to four rotations about a midpoint of the at least one of the regular pentagon and the dihedral group, and digits 5 through 9 are assigned to five reflections about five axes of symmetry of the at least one of the regular pentagon and the dihedral group.

17. A method for generating a personal identification number (PIN) having a number of N decimal digits, to be used for money cards and other security-requiring devices, comprising:

generating the personal identification number from a binary number having L digits so that the personal identification number is randomly distributed over an available number domain, wherein the binary number having L digits is generated at least in-part from data pertaining to an individual, and wherein the binary number is fully converted into a decimal number to generate the personal identification number, and when a first digit of the decimal number is equal to zero, then a correction value is added to a resultant decimal number so that a first digit of the decimal number becomes unequal to zero, digits of the resultant decimal number forming the decimal digits of the personal identification number.

18. The method of claim 17, wherein the binary number has a length L of 13, the resultant decimal number has four digits, and a preset value greater than 999 and smaller than 1807 is added to the resultant decimal number.

19. The method of claim 18, wherein a set of numbers 0 through 8191 is allocated to natural number n5 subsets M1, . . . , Mn5, and a preset value di is added to the resultant decimal number if it is an element of a set Mi, where 999<first decimal number d1<second decimal number d2< . . . <third decimal number dn5<1809.

20. The method of claim 17, wherein the binary number has a length L of 16, the resultant decimal number has five digits, and a preset value greater than 9999 and smaller than 34465 is added to the resultant decimal number.

21. The method of claim 20, wherein a set of numbers 0 through 65535 is allocated to natural number n5 subsets M1, . . . , Mn5, and a preset value di is added to the resultant decimal number if it is an element of a set Mi, where 9999<first decimal number d1<second decimal number d2< . . . <third decimal number dn5<34465.

* * * * *